United States Patent Office 3,219,601
Patented Nov. 23, 1965

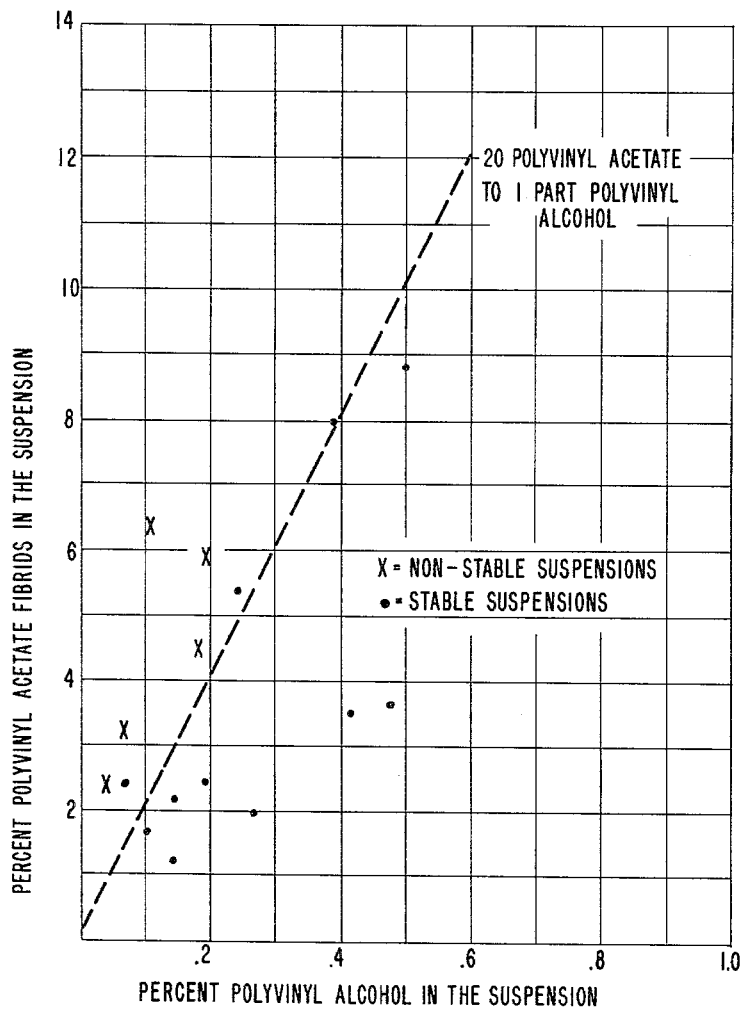

3,219,601
PROCESS FOR PRECIPITATING SHEET-FORMING FIBRIDS
Franklin Howard Koontz, Wilmington, Del., assignor to E. I. du Pont de Nemours and Company, Wilmington, Del., a corporation of Delaware
Filed May 31, 1962, Ser. No. 199,075
4 Claims. (Cl. 260—16)

The present invention relates to a novel and useful composition of matter and to a process for preparing the composition. More particularly, it relates to a composition containing sheet-forming particles of a polymer that is tacky under normal conditions. This application is a continuation-in-part of my application Serial No. 788,066, filed January 21, 1959 now abandoned.

It is an object of this invention to provide a composition of matter which is stable at room temperature. Another object is to provide sheet-forming particles of a tacky polymer which are suitable for extended storage. Another object is to provide a process for the preparation of stable sheet-forming particles. A still further object is to provide polyvinyl acetate fibrids which are stable and retain their identity under normal conditions. Other objects will become apparent as the description of the invention proceeds.

In the drawing, which is a graphical presentation of data from Example 4 illustrating embodiments of the invention, the dots indicate stable suspensions containing various concentrations of polyvinyl acetate particles (ordinate) and various concentrations of polyvinyl alcohol stabilizer (abscissa) in the suspensions. The crosses indicate concentrations forming non-stable suspensions. The dotted line represents a 20:1 weight ratio of particles to stabilizer.

In one embodiment of this invention, the sheet-forming particles are prepared in an aqueous system to produce an aqueous suspension of the sheet-forming particles directly from the shear precipitation process.

In a preferred embodiment, fibrids of polyvinyl acetate are prepared in an aqueous system to give fibrids suspended in an aqueous liquid solution of carboxymethyl cellulose, polyvinyl alcohol or other hydrophilic colloid.

The term aqueous liquid suspension is used in its broad sense to signify either a free-flowing dilute suspension or a wet, slushy mixture.

These objects are accomplished by the present invention which provides stable aqueous liquid suspensions of polymeric sheet-forming particles as subsequently defined and being fibrids (particles formed from a solution of polymer under special conditions of shear-precipitation) of normally tacky polymers which agglomerate at temperatures below about 25° C. unless stabilized. The particles are stabilized by the presence in said suspension of at least about 5%, and preferably from about 5% to 50%, based on the weight of said particles, of a water-soluble polymer.

In a particular embodiment of this invention, there is provided a stable aqueous liquid suspension containing up to about 9% of polyvinyle acetate fibrids, based on the total weight of the suspension, the fibrids being stabilized by the presence in the suspension of at least 5%, and preferably about 5% to 50%, based on the total weight of said fibrids, of a water-soluble polymer.

The present invention also provides an improvement in the process of making sheet-forming particles of a polymer which is normally tacky at a temperature below about 25° C., by introducing a solution of the polymer, in an organic liquid, into a non-solvent for the polymer under conditions of high shear-precipitation as defined hereinafter. The improvement comprises carrying out the process in the presence of an aqueous solution of a water-soluble polymer stabilizer for the sheet-forming particles, the water-soluble polymer being present in the amount of from about 0.1 to about 5%, based on the weight of said non-solvent.

The term "sheet-forming particles" is used to designate supple polymeric particles having one dimension of minor magnitude relating to the largest dimension and capable of forming a waterleaf or paper-like structure on a papermaking machine. The term includes "fibrids" of synthetic polymers and similar particles made from other polymers such as natural rubber. Fibrids, their characteristics, preparation and uses, are discolsed in Parrish et al., U.S. Patent No. 2,988,782. The preparation of fibrids as disclosed in the Parrish et al. patent is carried out by introducing a solution of the polymer into a non-solvent for the polymer under conditions of shear precipitation. By "shear precipitation" is meant the process in which a solution of a polymer is added to a precipitant for the polymer under conditions such that the polymer is subjected to a high degree of shear during precipitation. The precipitation variables are controlled to maintain the precipitation number (the "$P'_A$" value) of the system between about 100 and 1,300,000, preferably between 400 and 1,000,000. The $P'_A$ values for the preferred precipitation system with soft polymers is between 100 and 80,000. The sheet-forming particles of rubber and other polymers are formed in the same manner by substituting a solution of the rubber for the solution of the polymer used in fibrid formation.

The term "fibrid" is employed herein to designate a particle which possesses (a) an ability to form a waterleaf having a couched wet tenacity of at least about 0.034 lbs./in./oz./sq. yd. when a plurality of the said particles is deposited from a liquid suspension upon a screen, which waterleaf, when dried at a temperature below about 50° C., has a dry tenacity at least equal to its couched wet tenacity and (b) an ability, when a plurality of the said particles is deposited concomitantly with staple fibers from a liquid suspension upon a screen, to bond a substantial weight of the said fibers by physical entwinement of the said particles with the said fibers to give a composite waterleaf with a wet tenacity of at least about 0.002 grams per denier. In addition, fibrid particles have a Canadian freeness number between 90 and 790 and a high absorptive capacity for water, retaining at least 2.0 grams of water per gram of particle under a compression load of about 39 grams per square centimeter.

Any normally solid wholly synthetic polymeric material may be employed in the production of fibrids. By "normally solid" is meant that the material is non-fluid under normal room conditions. By " . . . an ability to . . . bond a substantial weight of . . . (staple) fibers . . . " is meant that at least 50% by weight of staple based on total staple and fibrids can be bonded from a concomitantly deposited mixture of staple and fibrids.

It is believed that the fibrid characteristics recited above are a result of the combination of the morphology and nonrigid properties of the particle. The morphology is such that the particle is nongranular and has at least one dimension of minor magnitude relative to its largest dimension, i.e., the fibrid particle is fiber-like or film-like. Usually, in any mass of fibrids, the individual fibrid particles are nonidentical in shape and may include both fiber-like and film-like structures. The nonrigid characteristic of the fibrid, which renders it extremely "supple" in liquid suspension and which permits the physical entwinement described above, is presumably due to the presence of the "minor" dimension. Expressing this dimension in terms of denier, as determined in accordance with the fiber coarseness test described in Tappi 41, No. 6 (June) 1958, fibrids have a denier no greater than about 15.

Complete dimensions and ranges of dimensions of such heterogeneous and odd-shaped structures are difficult to express. Even screening classifications are not always completely satisfactory to define limitations upon size since at times the individual particles become entangled with one another or wrap around the wire meshes of the screen and thereby fail to pass through the screen. Such behavior is encountered particularly in the case of fibrids made from soft (i.e., initial modulus below 0.9 g.p.d.) polymers. As a general rule however, fibrid particles, when classified according to the Clark classification test (Tappi 33, 294–8, No. 6 (June) 1950) are retained to the extent of not over 10% on a 10-mesh screen, and retained to the extent of at least 90% on a 200-mesh screen.

Fibrid particles are usually frazzled, have a high specific surface area, and as indicated, a high absorptive capacity for water. A typical fibrid particle is described in U.S. Patent No. 2,999,788 to Morgan, and Belgian Patent No. 564,206, granted July 23, 1958.

The term "normally tacky" polymers is used to signify polymers whose freshly formed surfaces display pressure sensitive adhesion to each other or to themselves in either the dry or wet state. Such tackiness of self-adhesion at room temperatures is commonly associated with elastomers and is considered to be a function of the polymers having a second-order transition temperature below about 25° C. Among the "tacky" polymers which may be used in the practice of this invention are natural rubber, synthetic rubber, polyvinyl acetate, chlorinated polyethylenes, elastomers, copolymers of butadiene/styrene, butadiene/acrylonitrile, polychlorobutadiene, copolymers of isobutylene with small proportions of butadiene, copolymers of monochlorotrifluoroethylene with vinylidene fluoride and the tacky elastomers such as described in U.S. Patent Nos. 2,692,873, 2,670,267 and 2,623,033, which deal, respectively, with polycarbamates, polyamides and polyesters.

The term "water-soluble polymer" is used to signify that the polymer used as a stabilizer is soluble in water to the extent of at least 0.1% by weight. Suitable water-soluble polymers may be found among natural polymers as casein, gum tragacanth, gelatin, glue, gum arabic, dextrines, sodium alginate; among derivatives of natural polymers as carboxymethyl cellulose, hydroxyethyl cellulose and methyl cellulose as well as synthetic polymers as sodium polyacrylate, polyvinyl alcohol, poly-N-vinyl pyrrolidone, poly-N-vinyl piperidone, polyacrylamides and poly-N-vinyl amides, to name a few.

The following examples are given to illustrate the invention and are not intended to limit it in any manner. All parts are given in parts by weight unless otherwise expressed.

EXAMPLE I

A mixture of 300 parts of glycerine, 80 parts of water, and 20 parts of a 5% aqueous solution of a commercial grade of polyvinyl alcohol ("Evanol" 50–42) is placed in a Waring Blendor whose vessel is equipped with a jacket through which ice water can be circulated. When the contents have been cooled to 5° C., the agitator is turned on at maximum speed, and 27 parts of a 15% solution of polyvinyl acetate in acetone is added slowly in a thin but continuous stream which enters the agitated precipitant at the crest of the cortex. The agitated mixture is diluted with 200 parts of cold (5° C.) water, agitation is continued for 7 to 10 seconds, and the blendor is turned off. The contents are poured onto a 200-mesh screen, and the fibrids are washed on the screen with 10 successive portions of 1000 parts of cold water. The fibrids remaining on the screen are diluted to 2% concentration in water containing 0.25% of polyvinyl alcohol ("Elvanol" 50–42).

The resulting suspension of polyvinyl acetate fibrids is stable over a temperature range of 5° to 50° C. Their dimensions are 2–5µ x 0.05–0.15 mm. In similar runs where the polyvinyl alcohol is not added to the washed polyvinyl acetate fibrids, the fibrids agglomerate at 5° to 15° C. to plastic masses which cannot be redispersed. Also, the omission of polyvinyl alcohol from the aqueous glycerine precipitant yields fibrids which agglomerate to large masses as the dispersion is allowed to warm at room temperature.

A suspension containing 1.0 grams of the stable polyvinyl acetate fibrids as made above is mixed with a slurry of poly(ethylene terephthalate) staple prepared by thoroughly wetting 2.15 grams of ¼ inch 2 d.p.f. (0.22 Tex) fiber with a 5% solution of a surface-active agent ("Alkanol HC," a polyethylene oxide ether of a long chain fatty alcohol) and then suspending them in 8 liters of water. The fibrid-fiber blend is then poured into the headbox of an 8" x 8" sheet mold containing a 200-mesh screen. Vacuum is applied to the reservoir of the sheet mold before the gate valve is opened so that the water is exhausted very quickly and a uniform waterleaf is obtained. The waterleaf is covered with a 200-mesh screen and washed 3 times with approximately 10 liters of fresh water. The waterleaf is then removed from the screen, rolled between blotters with a steel rolling pin and dried in an oven at 120° C. for 30 minutes. The dried sheet is pressed at 160° C. at 700 p.s.i. for 15 seconds. The pressed sheet with a basis weight of 2.8 ounces/square yard has a tenacity of 14.5 pounds/inch/ounce/square yard.

The replacement of the polyvinyl alcohol in the above shear precipitation with 0.5% sodium carboxymethyl cellulose as a protective agent gives a slurry of fibrids which is stable when warmed to 25° C.

EXAMPLE II

A copolyamide elastomer is made from a mixture of 40 mol percent N,N'-diisobutylhexamethylenediammonium-sebacate, 20 mol percent N-isobutylhexamethylenediammonium-sebacate, and 40 mol percent hexamethylenediammonium-sebacate as described in Bredeson U.S. Patent No. 2,670,267.

25 ml. of a 10% solution of the above polymer in sulfuric acid is slowly added to a mixture of 300 ml. of a 1.2% aqueous solution of carboxymethyl cellulose and 100 ml. of acetone at room temperature stirred in a one-quart Waring Blendor at maximum speed. The fibrids formed are diluted with water, filtered on a screen and redispersed in water. A waterleaf of the fibrids alone is formed using the technique of Example I. The waterleaf is dried at 110° C. to give an elastic sheet with pleasing aesthetics having a basis weight of 10.2 ounces per square yard, and a tensile strength of 0.63 pound/inch/ounce/square yard.

When the above precipitation is repeated in the absence of the carboxymethyl cellulose only coarse gummy particles are obtained that do not form sheets.

EXAMPLE III

A 20% solution of a commercially available sulfochlorinated polyethylene elastomer ("Hypalon 20," made by the Du Pont Company of Wilmington, Delaware) in tetrahydrofuran is prepared.

A stable suspension of fibrids is prepared by slowly adding 10 ml. of the above solution to a one-quart Waring Blendor jar containing 400 ml. of an 0.5% aqueous sodium carboxymethyl cellulose solution and 20 ml. of ethylene diamine (curing agent for the elastomer) while stirring at full speed.

Strong, uniform hand sheets are prepared from the fibrids alone as in Example I. After drying at 150° C. for 30 minutes, the sheets are strong and elastic.

When the precipitation is repeated in the absence of the sodium carboxymethyl cellulose, only coarse gummy clumps of polymer are formed which do not form hand sheets.

Cured structures formed of the fibrids of this example and staple fibers can be used as gasket material, for conveyor belts and the like.

EXAMPLE IV

In a series of runs, polyvinyl acetate fibrids are produced and washed as in Example I. Several batches of fibrids are combined to yield a wet fibrid cake containing 8½ grams of fibrid calculated on a dry basis. The wet fibrid cake is added to 90 ml. of a 0.25% aqueous solution of polyvinyl alcohol ("Elvanol" 50–42) with mild agitation for 10–15 minutes to assure that all of the fibrids come into contact with the polyvinyl alcohol. The resultant aqueous suspension has a total volume of 345 ml. and contains 2.4% fibrids and 0.07% polyvinyl alcohol, respectively, based on the total weight of the suspension. This corresponds to about 3% of polyvinyl alcohol based on the weight of the fibrids in the suspension. The suspension of polyvinyl acetate fibrids is stable over a temperature range of 5° to 50° C. In similar runs, using the same concentration of fibrids and a higher concentration of polyvinyl alcohol (7, 8, and 13%, respectively, based on the weight of the fibrids) stable aqueous suspensions are also obtained. On the other hand, for this concentration of fibrids, the use of less than 3% polyvinyl alcohol, based on the weight of the fibrids, results in the production of suspension in which the fibrids agglomerate at room temperature to plastic masses which cannot be redispersed even with vigorous agitation.

In a further series of runs, aqueous suspensions containing higher concentrations of polyvinyl acetate fibrids up to a maximum of about 8.8% fibrids, based on the total weight of the suspension, are prepared. In all cases, the presence in the suspension of at least about 5% of polyvinyl alcohol, results in a stable aqueous suspension as can be seen from the table below. In the table, the figures in columns 1 and 2, respectively, show the percent of fibrids and polyvinyl alcohol in the final aqueous suspension, based on the total weight of the suspension. Column 3 shows the percent of polyvinyl alcohol in the suspension, based on the weight of the fibrids.

*Table I*

| Col. 1 | Col. 2 | Col. 3 | Comments |
|---|---|---|---|
| 1.3 | 0.1 | 6.0 | Stable. |
| 1.7 | 0.14 | 11.0 | Do. |
| 2.0 | 0.27 | 13.0 | Do. |
| 2.2 | 0.14 | 7.0 | Do. |
| 2.4 | 0.04 | 1.7 | Fibrids agglomerate and cannot be redispersed. |
| 2.4 | 0.07 | 3.0 | Stable. |
| 2.4 | 0.19 | 8.0 | Do. |
| 3.2 | 0.07 | 2.2 | Fibrids agglomerate and cannot be redispersed. |
| 3.5 | 0.42 | 12.0 | Stable. |
| 3.6 | 0.48 | 13.0 | Do. |
| 4.5 | 0.18 | 4.0 | Fibrids agglomerate and cannot be redispersed. |
| 5.4 | 0.24 | 4.4 | Stable. |
| 5.9 | 0.19 | 3.2 | Fibrids agglomerate and cannot be redispersed. |
| 6.4 | 0.11 | 1.7 | Do. |
| 8.0 | 0.39 | 4.9 | Stable. |
| 8.8 | 0.50 | 5.7 | Do. |

The relationship of the amount of water-soluble polymer to the stability of the suspension may be better understood by reference to the drawing. In the figure, the percent of polyvinyl acetate fibrids in the suspension (column 1) is plotted against the percent of polyvinyl alcohol in the suspension (column 2), based on the total weight of the suspension. The dotted line represents a concentration of 5% of polyvinyl alcohol based on the weight of the fibrids. From the figure it may be seen that a minimum amount of water soluble polymer must be present in the final aqueous suspension in order to prevent agglomeration of the fibrids into plastic masses, which cannot be redispersed. In general, the suspension should contain at least about 5% of polyvinyl alcohol, based on the weight of the fibrids, although slightly lesser amounts may be used for the more dilute fibrid suspensions.

Useful solvents or solvent mixtures for preparing polymer solutions to be used in the direct preparation of sheet-forming particles by the one-step "shear precipitation" process of this invention should dissolve at least about 5% by weight of the polymer, copolymer, or polymer mixture. When solutions containing concentrations below this level are used, the fibrids obtained on precipitating the polymer tend to be too fine and too small to be useful in such applications as the preparation of sheet products. Most fibridations are carried out at concentrations below 50%.

A large variety of organic liquids are suitable for preparing these solutions. The particular solvent chosen will depend upon toxicity, cost, the polymer being used, type of sheet-forming particle desired, and the like. As is usual, the best balance between cost and optimum product will be selected. Another useful group of liquids includes those which dissolve the polymer at high temperatures but which are nonsolvents at temperatures in the neighborhood of room temperature. Thus, it is possible to use these liquids as both solvents and precipitants by controlling the temperature.

A liquid is suitable as a precipitant if it dissolves no more than about 3% by weight of the polymer. It is preferable, but not absolutely essential, that the precipitant be miscible with the polymer solvent in the proportions used. Some degree of miscibility is, of course, essential. Suitable precipitants are water, glycerol, ethylene glycol, ether, carbon tetrachloride, acetone/hexane and dioxan/hexane mixtures, triethanolamine, etc. Water-miscible precipitants are preferred and aqueous organic mixtures, particularly water-glycerol mixtures, are an important group of precipitants. For use in non-aqueous systems, liquid aliphatic hydrocarbons such as kerosene, petroleum ether, white oil, etc., as well as polyethylene glycols and polypropylene glycols may be used as the precipitant.

Mixtures of solvents and precipitants, such as dilute aqueous solutions of the solvent, have also been found to be useful. For example, polymers dissolved in hydrotropic salt solutions may be precipitated in water or dilute salt solutions. Water alone is desirable for economic reasons and it can be used as a precipitant. If fibrids with improved drying characteristics and better affinity for hydrophobic materials are desired, it is preferable to use a nonpolar hydrophobic medium as the precipitant.

The precipitants are operable over a wide range of viscosities, e.g., from about 1 to about 1,500 centipoises. The viscosity of the precipitating medium may be controlled over a wide range by changing the temperature or by the use of additives. Relatively viscous precipitating media are preferred. The effectiveness of the shearing action provided by the stirrer is enhanced by decreasing the viscosity of the solution and/or increasing the viscosity of the precipitant. Another method of increasing the effectiveness of the shearing medium is to add insoluble particulate material, such as sand, lead shot or by the use of a saturated brine as the precipitant.

Either the precipitant or the solution, or both, may contain additives for modifying the types of slurries and/or the nature of the sheet products obtained. Thus, the precipitant and/or the solution may contain fibrids from the same or different polymers. The precipitant and/or the solution may also contain, in place of, or, in addition to, the fibrids described herein, synthetic and/or natural staple fibers, such as those from the nylons, poly(ethylene terephthalate), or polyacrylonitrile, staple fibers from cellulose, glass fibers, asbestos, etc. The precipitant and/or the solution may also contain dyes, antistatic agents, surfactants, fillers, such as silica or titanium dioxide, pigments, antioxidants, etc. The addition of these substances to the polymer solution prior to precipitation can produce a marked increase in the tensile strength, tear strength, and tear factor of sheets prepared from the fibrids, when compared to the unmodified sheets. Another modification involves the use of a polymer solution as a precipitant for a solution of a different polymer. Separation of the fibrids is accomplished readily when the polymers are incompatible.

SHEAR-PRECIPITATION

Fibrids are prepared by precipitating polymers from solution in a shear zone (as described in the aforementioned Parrish et al. patent) so that the precipitating polymer particles are subjected to relatively large shearing forces while they are in a plastic, deformable state. The variable which appears to play the major role in controlling the nature of the products is the rate of shear, R, of the polymer solution as it is converted to an elongated article. This is dependent upon the shearing stress, S. The nature of the product is also dependent upon the length of time, $t$, that the solution is in a deformable state (i.e., prior to complete precipitation).

The rate of shear and the shearing stress are related by Newton's viscosity equation where V is viscosity $$S = VR \qquad (1)$$

Using the subscript $s$ for the solution and the subscript $p$ for the precipitant, the folowing equations are obtained from Equation 1.

$$S_s = V_s R_s \qquad (2)$$

$$S_p = V_p R_p \qquad (3)$$

At the interface between precipitant and solution droplet $$S_p = S_s \qquad (4)$$

Accordingly, Equations 2 and 3 may be equated. On suitable rearrangement one obtains $$R_s = \frac{V_p R_p}{V_s} \qquad (5)$$

$R_s$ is referred to as the mechanical factor of shear precipitation and describes the mechanical variables which determine the form of a polymeric precipitate obtained by adding a polymer solution to a stirred precipitant. However, the type of products formed will also depend on $t$, the time interval during which the precipitate is deformable. The product, $R_s t$, has been designated $P'_A$ (the absolute shear precipitation number), which is determined by the relationship $$P'_A = \frac{V_p R_p t}{V_s} \qquad (6)$$

The following section describes the development of an equation from which absolute shear precipitation numbers may be calculated. By the use of this equation it is possible to predict quite simply from a few simple measurements whether or not a system will produce fibrids.

If a thin plate is pulled through a liquid, a thin boundary layer having a high shear rate is formed at the surface of the plate. The rate of shear outside of this layer can be safely neglected in making calculations. The thickness of this layer can be determined in accordance with Prandtl's theory (L. Prandtl and O. G. Tietiens, "Applied Hydro- and Aero-dynamics," McGraw-Hill Book Company, New York 1934).

By the utilization of known relationships, the following two equations for rate of shear can be developed.

$$R_s \text{ (laminar)} = P_A = 0.005 a^{3/2} b^{-1/2} d_p^{1/2} \frac{V_p^{1/2}}{V_s} (Q)^{3/2} \qquad (7)$$

$$R_s \text{ (turbulant)} = P_A = 0.13 a^{6/5} b^{-4/5} d_p^{1/5} \frac{V_p^{4/5}}{V_s} (Q)^{6/5} \qquad (8)$$

In these formulas
$a$ = length of stirrer blade from axis to tip in centimeters
$b$ = average width of stirrer blade in centimeter
$d_p$ = density of the precipitant in gram/cm.$^3$
$Q$ = r.p.m. of stirrer.

The decision as to the proper equation to use (i.e., whether to use the one for laminar flow or the one for turbulent flow) can be made by calculating the Reynolds' number, $R_e$, for the system. However, for this work the critical value has been set at 3350, since this is the value at which the calculated $R_s$ is the same regardless of which formula is used. Below this value Equation 7 is used and above it Equation 8 is used.

The values obtained by using these equations express the mechanical factor of the shear precipitation process for preparing fibrids in terms of absolute shear rates inside a solution droplet. The results are expressed in units of second$^{-1}$ and are thus independent of the type of mixing device used.

The $P'_A$ values of all shear precipitations illustrated in the examples are in the range 100 to 1,300,000.

The value of $t$ is determined by a test in which the liquid proposed for use as a precipitant is added from a burette to the stirred polymer solution from which it is intended to produce fibrids. The volume percent of precipitant present in the solvent/precipitant mixture when a permanent precipitate is first formed is designated as X, which is related to $t$, as shown by the following section.

$$\frac{100(X - C_s)}{C_p - C_s} = 50(1 - \psi) \qquad (9)$$

For simplicity the notation Y will be used for the right hand side of Equation 9.

$$Y = \frac{100(X - C_s)}{C_p - C_s} \qquad (10)$$

In these two equations the symbols have the following meaning.

$C_s$ = volume percentage of precipitant initially present in the polymer solution.
$C_p$ = volume percentage of precipitant initially present in the precipitating bath.

$$\psi = \frac{2}{\sqrt{\pi}} \int_0^{\frac{y}{2\sqrt{Dt}}} e^{-z^2} dz \qquad (11)$$

For many systems of practical interest $C_s = 0$ and $C_p = 100$. In such cases $Y = X$, and Equation 9 may be written in the simplified form $$X = 50(1 - \psi) \qquad (12)$$

In Equation 11 D is the diffusion coefficient. Diffusion is the rate of process on which the formation of fibrids is dependent. Thus, $t$ represents the characteristic time required in a given system for the precipitant concentration to build up to the value of X at some specified distance inward from the surface of the polymer droplet. A value of $10^{-6}$ cm.$^2$/sec. has been assigned to D. Taking the average dimensions of fibrids into consideration, the distance, $y$, which the precipitant must diffuse in the time, $t$, has been set at 0.1 micron. It is assumed that precipitation will occur instantaneously when the concentration, X, is reached.

Values of $t$ in microseconds (0.000001 second) are selected in the range 1 to 1000. The corresponding values of Y in Equation 9 are then calculated with the aid of a Table of Probability Integrals in Lange's Handbook, using the formulas given above. These values are then plotted. The value of X is determined for a particular system by titration. From this, Y is calculated with the aid of Equation 10, and the value of $t$ is determined from the previously calculated relationship between Y and $t$.

The value of X is specific for a given system. In a system in which the solvent and precipitant are constant, the relationship between $t$ and the polymer concentration can be determined readily. In many cases the value of X changes very little with polymer concentration in such systems and $t$ is substantially independent of concentration.

The precipitations of this invention are complete in less than about $80 \times 10^{-6}$ seconds. In these systems the Y values are below about 40.

The usefulness of Equation 9 can be demonstrated in the following way. Let us assume that $t$ is a satisfactory range for making fibrids when $C_s=0$ and $C_p=100$, but that we wish to add some precipitant to the solution for practical reasons. If it is desired to keep $t$ constant, the relationship between $C_p$ and $C_s$ required to accomplish this may be found by equating Equations 9 and 12, and rearranging to give $$C_p = 100 + C_s - \frac{100 C_s}{X} \qquad (13)$$

When Y values are above about 40, it is never possible to compensate for the lack of precipitating power by decreasing the shearing force to obtain fibrids directly. However, at values below about 40, the two variables are interdependent.

Shearing action is dependent to some extent upon the design of the stirrer and the vessel in which precipitation occurs. Suitable shearing action for the process of this invention may be obtained by the use of a stirrer having the stirrer paddle or blade at an angle to the plane of rotation of the paddle or blade. The design of the stirrer blade used in the Waring Blendor has been found to be particularly satisfactory. Turbulence can be increased by introducing suitable baffles in the mixing vessel. This design is used in the commercial devices of the Waring Blendor type. The combination of stirrer action and container design generally used in the practice of this invention produces precipitating conditions which combine turbulence with adequate shear.

Modified stirring devices may be used to provide conditions yielding $P'_A$ falling within the area required for fibrid formation. For example, the stirrer may be fitted with a circular disc in place of a conventional blade or paddle. A modification of this device is one in which the polymer solution is introduced through a hollow shaft stirrer to the disc rotating in a precipitating medium.

Although the process has been illustrated primarily by the use of stirring devices, it is not limited thereto. Other types of apparatus may also be used provided that they produce sufficient shear. For example, the solution may be sheared between solid surfaces which are in relative motion; as for example, by the use of counter-rotating discs or a single-rotating disc and a stationary disc. The solution may be introduced through one disc and the precipitant through the other. The spacing between the disc may be adjusted to control the degree of shear.

The required shear can also be produced by jetting solutions into precipitants under the proper conditions. One form of such an apparatus would involve the use of co-current jets to combine solution and precipitant streams at high relative velocity. For example, a large blast burner could be used in which solutions would be fed through the central hole and water through the outer rim of holes. The solution and precipitant would be mixed in a converging section of pipe designed to increase the velocity of the flowing precipitant stream and attenuate the precipitating particles. An ordinary garden hose nozzle can be modified suitably to prepare the sheet-forming particles. The use of a simple T tube or its equivalent can be used in this process wherein the precipitant is passed at high speed through a straight tube and the polymer solution is jetted in from a side tube or from one or more holes around the periphery of the straight tube. All the above modifications of the apparatus used in this process lend themselves to calculations of the variables defined in this invention, so that the area of operability can be determined beforehand using any system of apparatus, polymer solution, and precipitant.

For the preparation of stable polyvinyl acetate fibrids, the use of a hydrophilic colloid such as carboxymethyl cellulose and polyvinyl alcohol in the shear precipitation process is preferred.

In the absence of protective agents, fibrids of polyvinyl acetate are obtained only at temperatures below 10° C. This temperature range can be extended to 25 to 35° C. by the presence of the agents of the present invention but even so it is preferred that the process be carried out at 0 to 5° C.

Sheet-forming particles produced by shear precipitation in water or aqueous precipitants are generally not isolatable as dry masses, since they cannot be dehydrated without excessive agglomeration of the fibrids. Such fibrids, therefore, are used directly and without isolation from the aqueous medium.

The compositions produced in accordance with the present invention are stable and can be stored for extended periods of time without agglomeration of the particles. They may then be formed into strong waterleaves (with or without fibers or other materials) which can be used as such or fused to give consolidated products. The final products are useful as papers, molded plastics when plied together, non-woven fabrics and the like.

Many other equivalent modifications will be apparent to those skilled in the art from a reading of the above without a departure from the inventive concept.

I claim:

1. In the process of precipitating sheet-forming fibrid particles from a solution in organic liquid of a polymer whose freshly formed surfaces display pressure sensitive adhesion to each other at a temperature below 25° C., by introducing the solution of the polymer into a non-solvent for the polymer under conditions of high-shear precipitation, said polymer being a member of the group consisting of (1) a copolymer prepared from 40 mol.-percent of N-N'-diisobutyl hexamethylene-diammonium sebacate, 20 mol.-percent of N-isobutyl hexamethylene-diammonium sebacate, and 40 mol.-percent of hexamethylene-diammonium sebacate and (2) a copolyester prepared from ethylene glycol and a 60/40 by weight mixture of the dimethyl esters of terephthalic acid and sebacic acid, the improvement which comprises carrying out the process in the presence of an aqueous solution of carboxymethyl cellulose present in the amount of about 0.1% to about 5% of the weight of said non-solvent.

2. The process of claim 1 wherein the polymer is a copolymer prepared from 40 mol.-percent of N-N'-diisobutyl hexamethylene-diammonium sebacate, 20 mol.-percent of N-isobutyl hexamethylene-diammonium sebacate, and 40 mol.-percent of hexamethylene-diammonium sebacate.

3. The process of claim 1 wherein the polymer is a copolyester prepared from ethylene glycol and a 60/40 by weight mixture of the dimethyl esters of terephthalic acid and sebacic acid.

4. A stable aqueous fibrid suspension of said polymer in claim 1, being the product of a process as defined in claim 1.

References Cited by the Examiner

UNITED STATES PATENTS

| | | | |
|---|---|---|---|
| 2,342,387 | 2/1944 | Catlin | 260—78 |
| 2,365,020 | 12/1944 | Stillwell | 260—17.4 |
| 2,789,903 | 4/1957 | Lukman et al. | 260—17.4 |
| 2,850,468 | 9/1958 | Giggey | 260—17.4 |
| 2,956,973 | 10/1960 | Holdsworth | 260—17 |
| 2,988,782 | 6/1961 | Parrish et al. | 260—29.2 |
| 3,003,979 | 10/1961 | Ptasienski et al. | 260—29.6 |

LEON J. BERCOVITZ, *Primary Examiner.*

DONALD E. CZAJA, *Examiner.*